(12) United States Patent
Yamazaki

(10) Patent No.: US 6,271,930 B1
(45) Date of Patent: Aug. 7, 2001

(54) IMAGE PROCESSING APPARATUS AND METHOD, AND STORAGE MEDIUM

(75) Inventor: Fumiya Yamazaki, Numazu (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/064,100

(22) Filed: Apr. 22, 1998

(30) Foreign Application Priority Data

Apr. 24, 1997 (JP) ..................................................... 9-107342

(51) Int. Cl.[7] .............................. B41B 15/00; H04N 1/46; G06K 9/00; G06K 9/48
(52) U.S. Cl. ........................... 358/1.18; 358/501; 358/1.9; 382/181; 382/199; 382/162; 382/165; 382/167; 382/299
(58) Field of Search ..................................... 382/181, 299, 382/199, 162, 165, 167, 283, 284; 358/518, 500, 448, 462, 529, 1.18, 508, 501, 1.9; 347/101

(56) References Cited

U.S. PATENT DOCUMENTS 5,832,186 * 11/1998 Kawana ................................. 358/1.9

* cited by examiner

*Primary Examiner*—Edward Coles
*Assistant Examiner*—Twyler Lamb
(74) *Attorney, Agent, or Firm*—Fitzpatrick, Cella, Harper & Scinto

(57) ABSTRACT

Control for adding additional information to an input image is efficiently done in correspondence with the recording sheet used without any sensors for detecting the type of recording sheet.

To achieve this object, according to this invention, whether or not the additional information is to be added to input image data to be hardly identified by the human eye is controlled in accordance with the type of image formation process. Alternatively, a method of adding the additional information to input image data to be hardly identified by the human eye is controlled in accordance with the image processing mode corresponding to the recording sheet.

15 Claims, 10 Drawing Sheets

IMAGE PROCESSING APPARATUS AND METHOD, AND STORAGE MEDIUM

BACKGROUND OF THE INVENTION

Field of the Invention

The present invention relates to an image processing apparatus and method, which can add predetermined additional information to an input image so as not to be easily identified by human eyes, and a storage medium which stores a program for performing the method.

Related Background Art

In recent years, along with the improvement of performance of image recording apparatuses such as color printers, color copying machines, and the like, higher-quality images can be formed. Owing to this, it is becoming easy to form an image having nearly the same image quality as that of securities such as bank notes and the like.

In order to inhibit such illicit image formation, a method of determining the formation conditions of an image by decoding the formed image is known.

For example, a dot pattern that represents the machine number of an image recording apparatus may be hidden in a color image to be printed.

Since this dot pattern is hidden in a specific color component (yellow) of the color image, it is hardly identified by the human eyes. Hence, the printed image seems nearly the same as an original image.

On the other hand, a conventional image recording apparatus, which can print on both an OHT (a transparent film used in an OHP) and normal paper, can print in correspondence with the fixing characteristics of recording agents (toner, ink) for these recording media by changing the image formation process (the traveling speed of each recording medium).

However, the conventional apparatus always adds a dot pattern with a constant density irrespective of different image formation processes of the image forming means. For example, in the image formation process for the OHT, since the OHT travels at a low speed to allow easy fixing of the recording agent, the dot pattern which should have a constant density becomes unwantedly conspicuous. As a technique for solving this problem, the type of recording sheet is detected using, e.g., a sensor, and additional information is added by a method suitable for the detected recording sheet. However, the apparatus becomes expensive since it must additionally comprise the sensor.

SUMMARY OF THE INVENTION

The present invention has been made in consideration of the above-mentioned prior arts, and has as its principal object to efficiently implement control for adding additional information to an input image in correspondence with the types of recording sheets without any sensors for detecting the types of recording sheets.

More specifically, it is another object of the present invention to provide a technique for adding additional information by an appropriate method and controlling whether or not additional information is added using the fact that the type of image formation process is likely to be selected in correspondence with the type of recording sheet.

In order to achieve the above objects, according to one preferred embodiment of the present invention, there is provided an image processing apparatus for outputting image data to image forming means which can execute a plurality of different kinds of image formation processes, comprising:

adding means for determining in accordance with the kind of image formation process to be executed by the image forming means whether or not additional information is to be added to input image data to be hardly identified by a human eye, and executing the addition in accordance with a determination result; and output means for outputting image data to which the additional information is added by the adding means to the image forming means.

It is still another object of the present invention to provide a technique for adding additional information by an appropriate method and controlling whether or not additional information is added using the fact that the type of image processing mode is likely to be selected in correspondence with the type of recording sheet.

In order to achieve the above object, according to one preferred embodiment of the present invention, there is provided an image processing apparatus, which selectively uses a plurality of image processing modes suitable for different types of recording sheets, comprising:

adding means for determining in accordance with the image processing mode used by the image processing apparatus to process input image data whether or not additional information is to be added to the input image data to be hardly identified by a human eye, and executing the addition in accordance with a determination result; and output means for outputting image data to which the additional information is added by the adding means to image forming means.

Other objects and features of the present invention will become apparent from the following description of the embodiments taken in conjunction with the accompanying drawings.

DETAILED DESCRIPTION OF THE PREFERRED EMBODIMENTS

Figure 10:
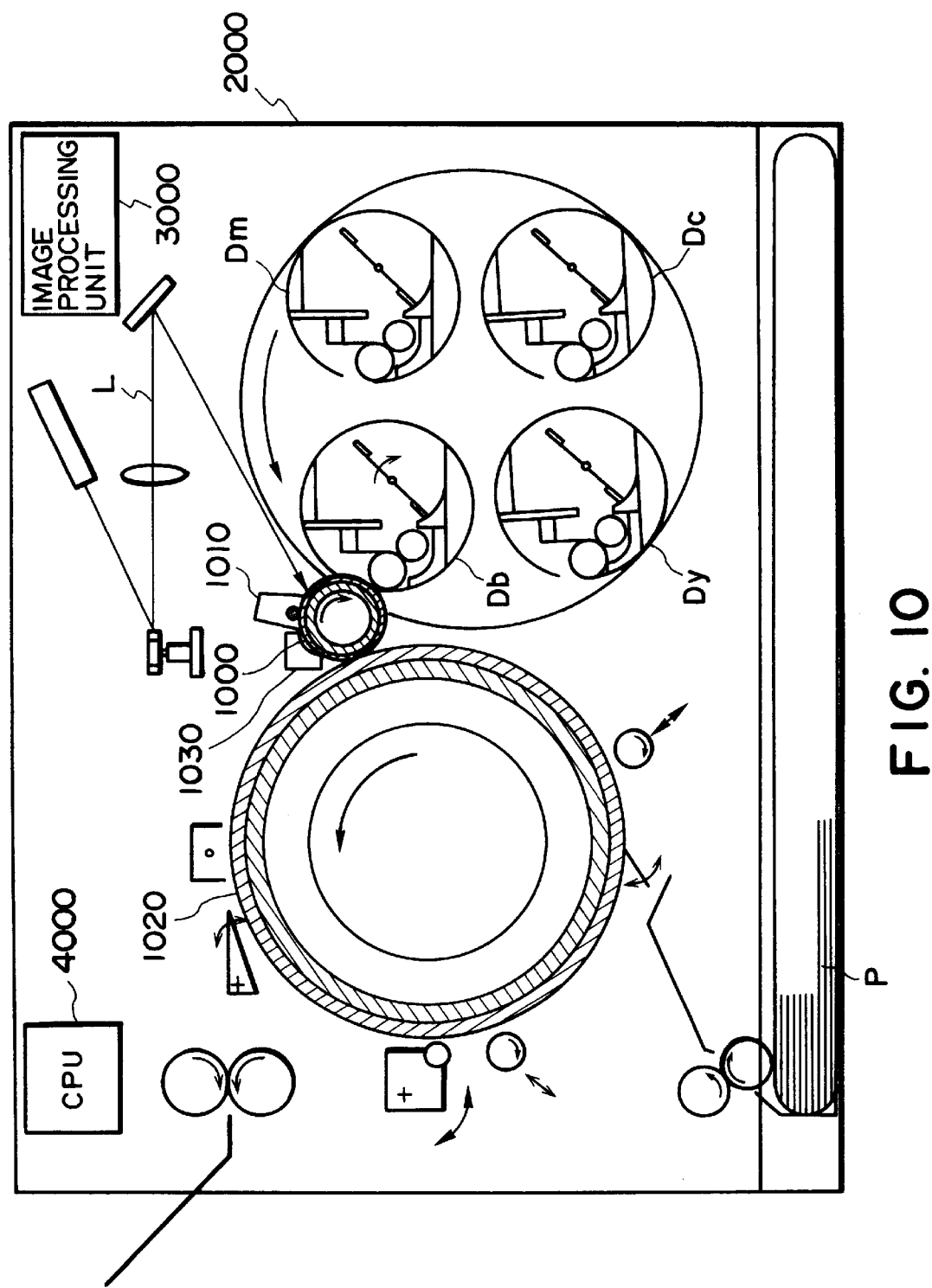
FIG. 10 is a sectional view showing an image forming apparatus used in the respective embodiments.

FIG. 10 shows a color electrophotography type image forming apparatus 2000 used in the respective embodiments of the present invention. In this arrangement, assume that the input density level is frame-sequentially input as 8-bit M (magenta), C (cyan), Y (yellow), and Bk (black) image signals, and an identifying signal to be added to an image will be referred to as an addon dot hereinafter.

In FIG. 10, the surface of a photosensitive drum 1000 is uniformly charged in a predetermined polarity by a charger 1010, and a first latent image (e.g., a magenta image) is formed on the surface of the photosensitive drum 1000 by exposure using a laser beam L. In this case, a predetermined developing bias voltage is applied to magenta developer Dm alone to develop the magenta latent image, thereby forming a first toner image (magenta toner image) on the surface of the photosensitive drum 1000.

Meanwhile, a transfer sheet P is fed at a predetermined timing. Immediately before the leading end of the transfer sheet P reaches the transfer start position, a transfer bias voltage (+1.8 kV) with a polarity (e.g., +) opposite to that of the toner is applied to a transfer drum 1020, and the transfer sheet P is electrostatically attracted on the surface of the photosensitive drum 1000. After that, the first toner image on the photosensitive drum 1000 is transferred to the transfer sheet P, and at the same time, the transfer sheet P is electrostatically attracted on the surface of the transfer drum 1020. Any residual magenta toner on the photosensitive drum 1000 is then removed by a cleaner 1030 to prepare for the latent image formation & development process of the next color.

Next, a second latent image (cyan image) is formed on the photosensitive drum 1000 using a laser beam L, and is developed by cyan developer Dc to form a second toner image. The second toner image (cyan toner image) is aligned to the position of the first latent image (magenta image) that has already transferred onto the transfer sheet P, and is then transferred onto the transfer sheet P. Upon transferring the second color toner image, a bias voltage of +2.1 kV is applied to the transfer drum 1020 before the leading end of the transfer sheet reaches the transfer unit.

Similarly, the third and fourth latent images (yellow and black images) are formed in turn on the photosensitive drum 1000, and are respectively developed by developers Dy and Db. Then, the obtained third and fourth toner images (yellow and black images) are transferred onto the transfer sheet P while being aligned to the positions of the previously transferred toner images. In this way, four color toner images are formed on the transfer sheet P to overlap each other.

Note that an image processing unit 3000 in FIG. 10 can implement various kinds of image processing to be done before printing in the respective embodiments.

In the image forming apparatus 2000, its internal CPU 4000 determines based on operation at an operation unit (not shown) or a command from an external computer whether an OHT recording mode for forming an image on an OHT (a transparent film used in an OHP) or a normal recording mode for forming an image on normal paper is selected, and image formation corresponding to the selected mode can be executed.

Figure 1:
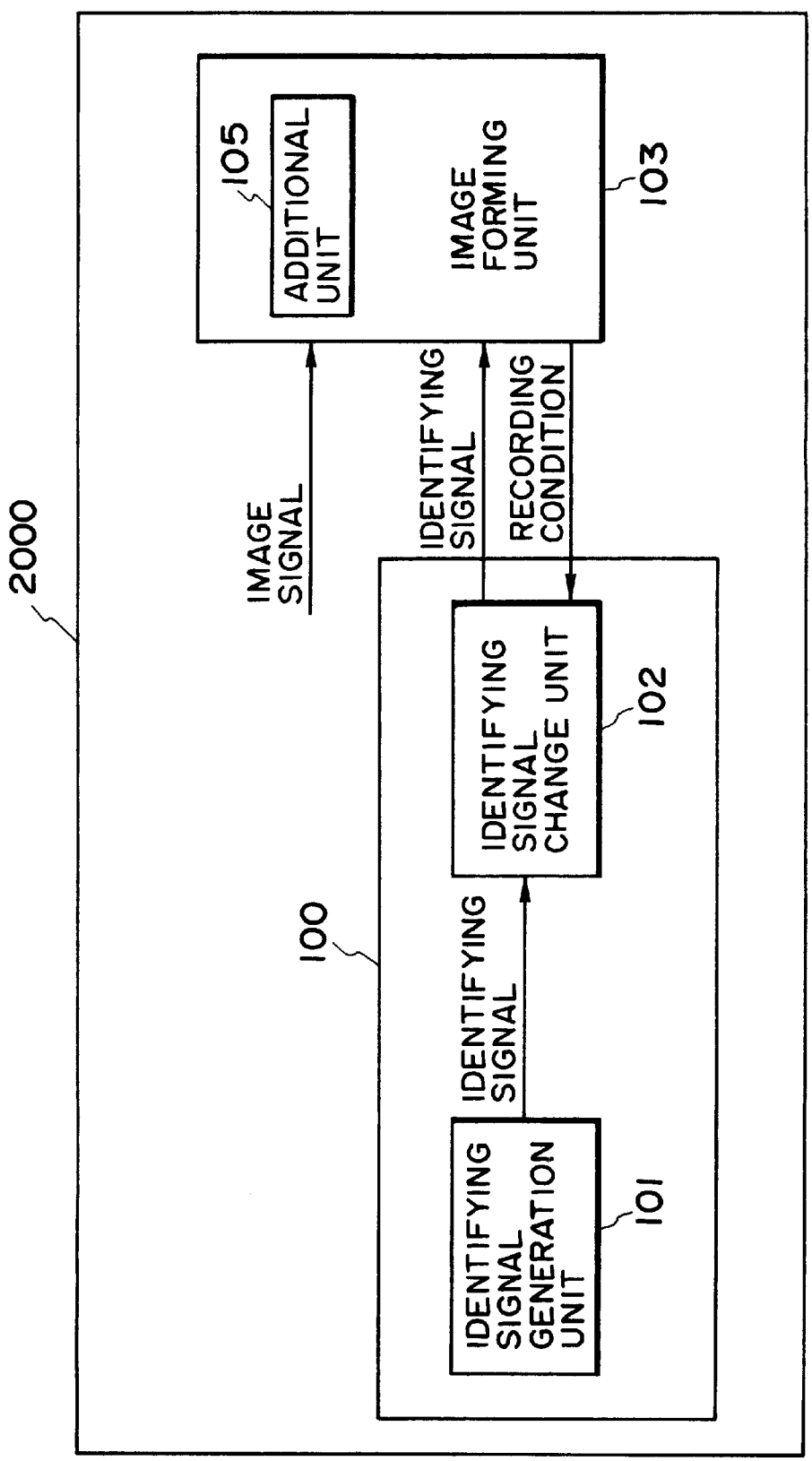
FIG. 1 is a block diagram showing the flow of signal processing according to the first embodiment of the present invention.

FIG. 1 shows the first embodiment of an image forming unit 103 and an image processor 100 as a part of the image processing unit 3000 in the above-mentioned image recording apparatus 2000.

In FIG. 1, an identifying signal generation unit 101 stores an identifying signal such as the machine number, model number, or the like of the image recording apparatus that can specify the apparatus, and outputs the identifying signal as needed.

An identifying signal change unit 102 controls whether or not the above-mentioned identifying signal is to be output to the above-mentioned electrophotography type image forming unit 103.

The image forming unit 103 is a portion other than the image processor 100 in the above-mentioned electrophotography type image recording apparatus shown in FIG. 10, and forms a full-color image by the above-mentioned method. The image forming unit 103 includes another image processor (additional unit 105 or the like).

The image forming unit 103 frame-sequentially receives M, C, Y, and Bk color image signals input from, e.g., an external computer.

In this embodiment, the image recording apparatus 2000 has a plurality of recording modes.

The recording modes include an OHT recording mode for forming an image on an OHT, and a normal recording mode for forming an image on normal paper. The OHT recording mode is characterized by setting a lower traveling speed of a recording medium than in the normal recording mode to improve the fixing characteristics of recording agents with respect to a recording medium such as an OHT, and is not limited to an OHT but can be applied to any other media as long as the recording medium has poor fixing characteristics of recording agents (toner) and requires a lower traveling speed than the normal recording mode.

The operation of the respective units upon forming a color image will be described in detail below.

Upon forming a color image, the identifying signal generation unit 101 outputs the identifying signal to the identifying signal change unit 102.

The identifying signal change unit 102 receives the identifying signal from the identifying signal generation unit 101, and also receives information pertaining to the recording mode from the image forming unit 103.

At the same time, the identifying signal change unit 102 checks the recording mode executed by the image forming unit 103. When the unit 102 determines that the image forming unit 103 is to form an image in the OHT recording mode, it does not output any identifying signal to the image forming unit 103. That is, no identifying signal is added to an input original image signal.

On the other hand, when the recording mode of the image forming unit 103 is the normal recording mode, the identifying signal change unit 103 outputs the identifying signal to the image forming unit 103 in synchronism with an image signal input from an external computer or the like. That is, the identifying signal is added to an input original image signal.

When the image forming unit 103 receives the identifying signal simultaneously with the input image signal, it modulates the image signal using the additional unit 105. The modulation method will be explained later. The modulated image signal is frame-sequentially printed by the above-mentioned print method.

When no identifying signal is input simultaneously with the input image signal, the unit 103 does not modulate the image signal using the additional unit 105, and directly starts printing.

With the above-mentioned processing, when different image formation processes must be used in correspondence with different fixing characteristics, the identifying signal is inhibited from being added in the image formation process that has improved fixing characteristics like in the OHT recording mode, thus preventing an image in which a pattern based on an identifying signal stands out from being formed.

Figure 6:
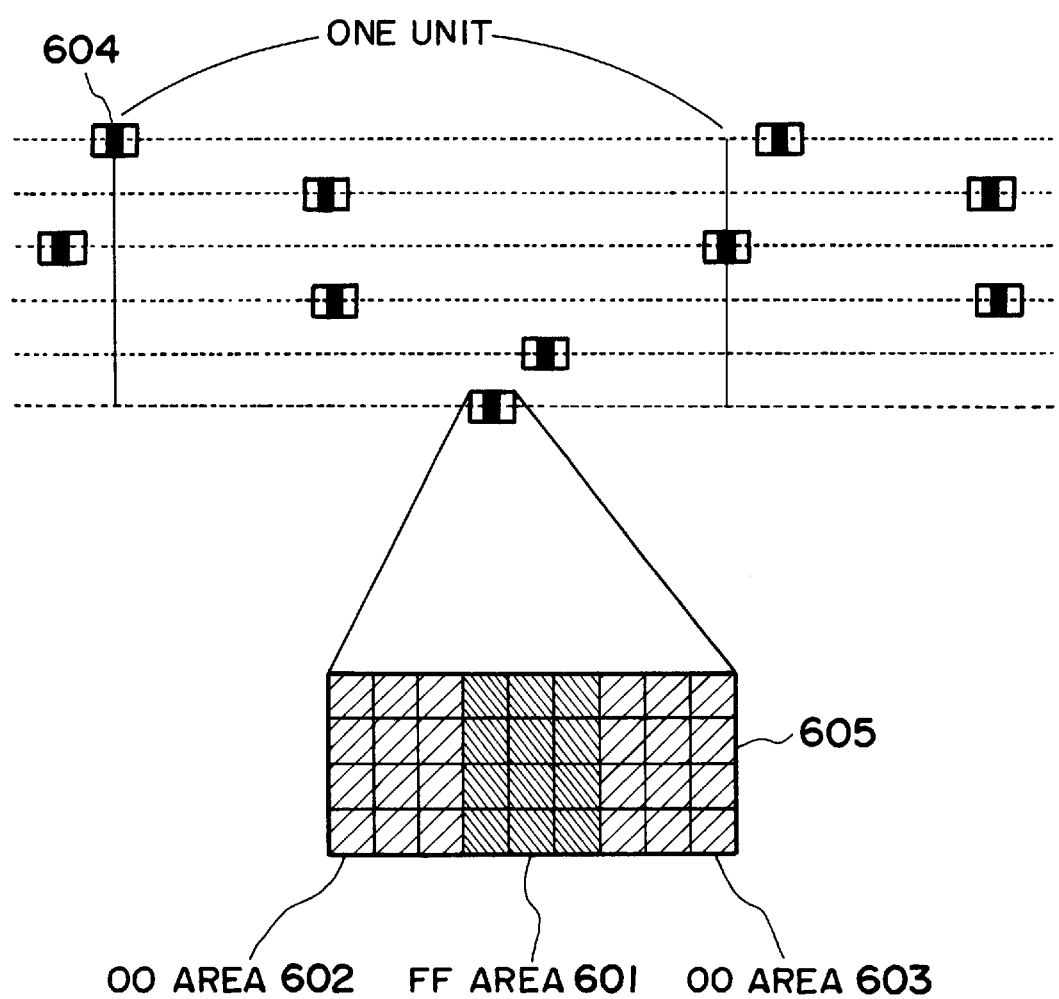
FIG. 6 shows an addon dot pattern used in the respective embodiments.

FIG. 6 shows the identifying signal generated and output by the identifying signal generation unit 101, i.e., an addon dot pattern.

The dotted lines in FIG. 6 represent addon lines, and addon dots 604 are formed on these addon lines. An addon dot illustrated in an enlarged scale is denoted by 605. Each addon dot is made up of an FF (highest density) area 601, and 00 (lowest density) areas 602 and 603 on the two sides of the area 601. The addon dots repetitively appear in an image. Dots in an input image at positions corresponding to these FF (highest density) and 00 (lowest density) areas are replaced by the highest and lowest density dots irrespective of the original image values.

Additional information (identifying signal) such as the machine number or the like of the apparatus can be expressed by an addon dot pattern as a combination of a plurality of dots. The additional information is expressed by the relative positions of the respective dots.

For example, assuming that 4-bit information can be expressed by the distance between two dots on different lines, since one unit includes 6 lines in FIG. 6, a numerical value or character information of 24 bits (=4×6) can be expressed.

This unit addon dot pattern is repetitively added in the main scan and subscan directions in one image (frame). In this manner, independently of the positions of portions cut away from the recording medium, the additional information can be decoded.

Figure 9:
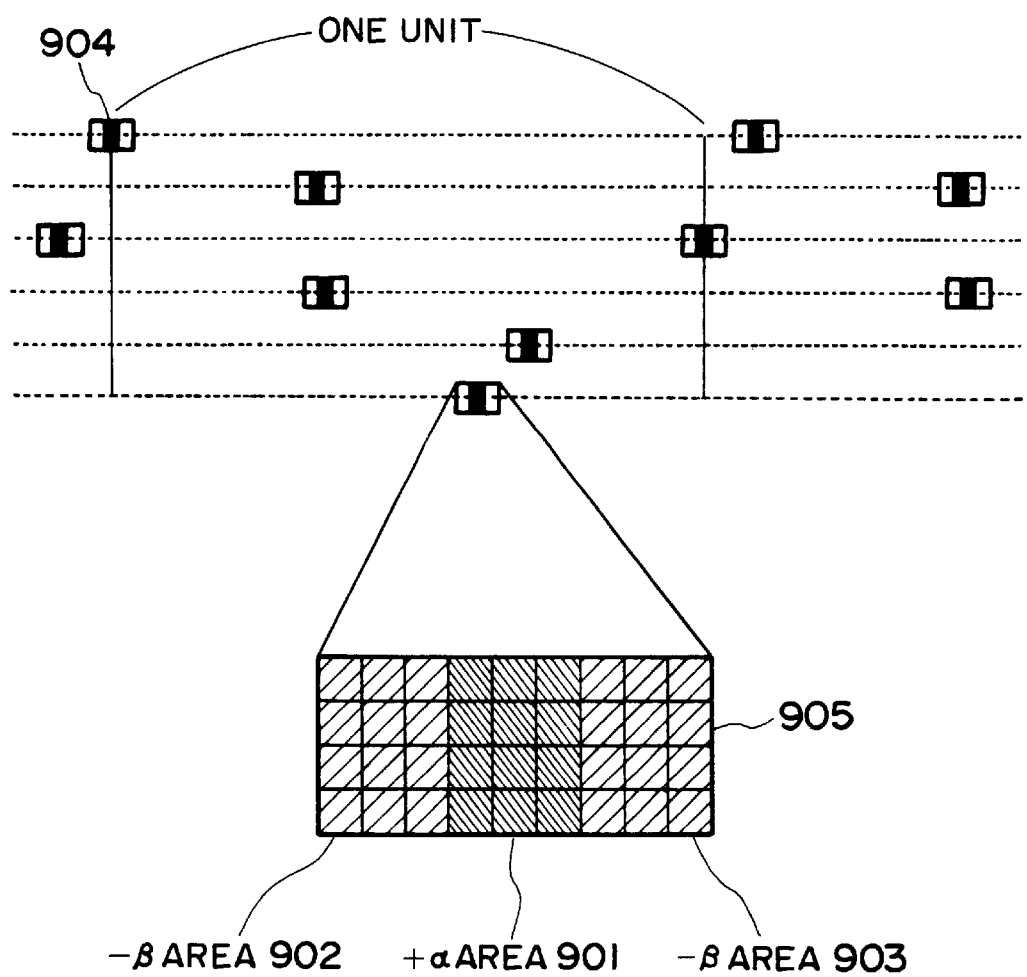
FIG. 9 shows an addon dot pattern used in the respective embodiments.

FIG. 9 shows another example of the identifying signal generated and output by the identifying signal generation unit 101, i.e., an addon dot pattern.

The dotted lines in FIG. 9 represent addon lines, and addon dots 904 are formed on these addon lines. The addon dot illustrated in an enlarged scale is denoted by 905. Each addon dot is made up of a +α area 901 and −β areas 902 and 903 on the two sides of the area 901. These +α and −β areas respectively raise and drop the density of a yellow-frame image in the input image signal by α and β in the additional unit 105.

Additional information (identifying signal) such as the machine number or the like of the apparatus can be expressed by an addon dot pattern as a combination of a plurality of dots. The additional information is expressed by the relative positions of the respective dots.

For example, assuming that 4-bit information can be expressed by the distance between two dots on different lines, since one unit includes 6 lines in FIG. 9, a numerical value or character information of 24 bits (=4×6) can be expressed.

This unit addon dot pattern is repetitively added in the main scan and subscan directions in one image (frame). In this manner, independently of the positions of portions cut away from the recording medium, the additional information can be decoded.

With the above-mentioned adding processing of the additional information (identifying signal), an identifying signal recorded on a recording medium can be prevented from standing out when it is recorded in the recording mode that has improved fixing characteristics in the electrophotography type image recording apparatus.

In this embodiment, the image recording apparatus 2000 has a plurality of image processing modes and recording modes, and whether or not the identifying signal is to be added to an image signal is selected in accordance with the recording mode. However, the present invention is not limited to such specific arrangement.

For example, the image processing unit 3000 has a plurality of modes including an OHT image processing mode for performing image processing, color processing, and the like suitable for recording an image on a recording medium with poor fixing characteristics such as an OHT, and a normal image processing mode for performing image processing, color processing, and the like suitable for normal paper. When the image processing and color processing are executed in the OHT image processing mode, the identifying signal change unit 102 is automatically controlled not to output the identifying signal, thus obtaining the same effect. More specifically, since the OHT image processing mode is likely to correspond to the OHT recording mode, if such processing mode is present, the control can be made in correspondence with that mode. Since the above-mentioned processing need not detect the type of recording sheet using a sensor or the like, the apparatus arrangement can be simplified.

Another embodiment of the present invention will be described below. A description of the same portions as those in the first embodiment will be omitted.

Figure 2:
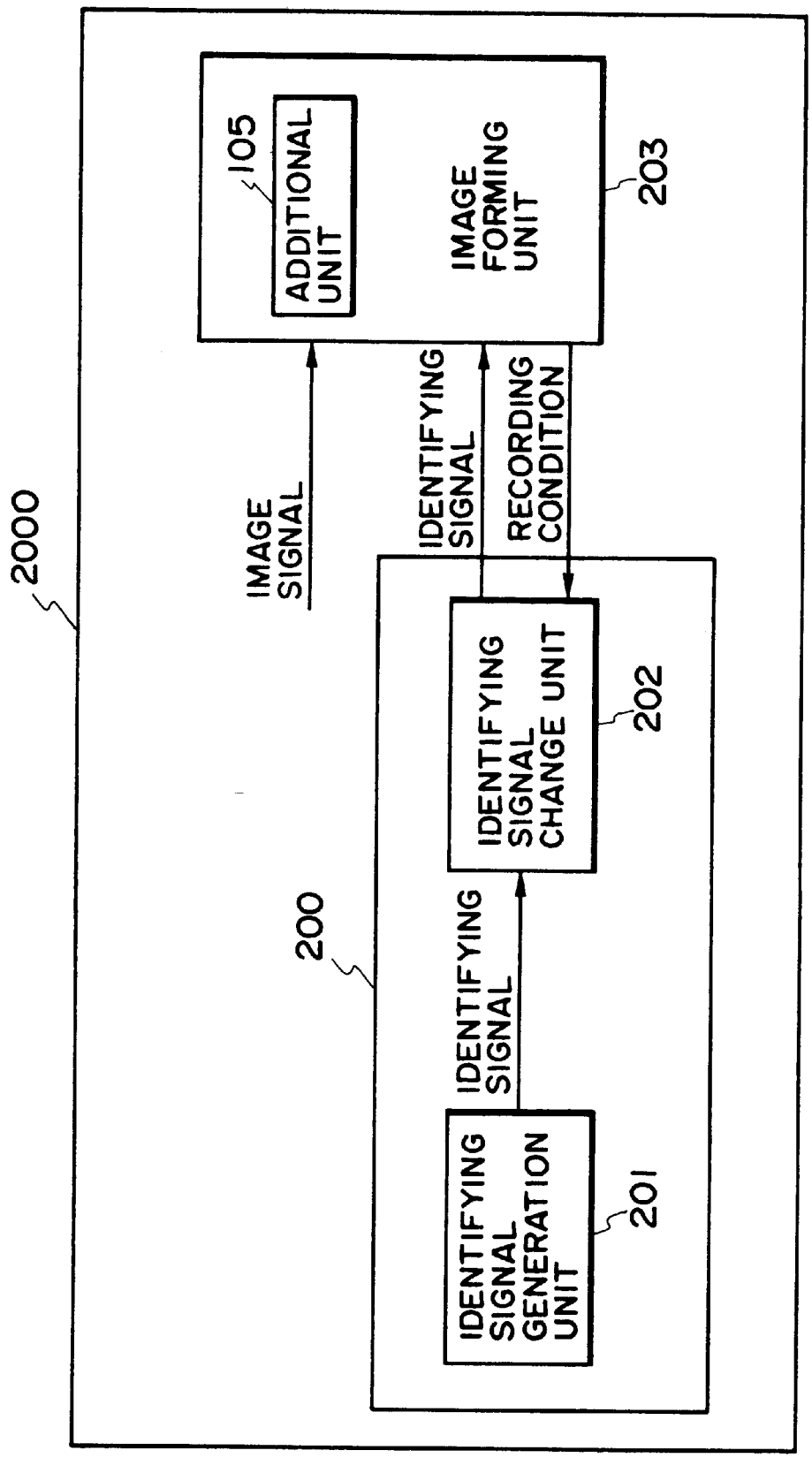
FIG. 2 is a block diagram showing the flow of signal processing according to the second embodiment of the present invention.

FIG. 2 shows the flow of signal processing according to the second embodiment. An identifying signal generation unit 201 generates an identifying signal to be added to an image from unique information such as the machine number or the like of the image recording apparatus, and outputs it to an identifying signal change unit 202.

The identifying signal change unit 202 receives the identifying signal from the identifying signal generation unit 201.

Also, the identifying signal change unit 202 receives recording mode information from an image forming unit 203.

When the recording mode of the image forming unit 203 is a recording mode for recording an image on a recording medium which has poor fixing characteristics of recording agents (toner) and requires a lower traveling speed of the recording medium than in a normal mode (the OHT recording mode in the first embodiment), the identifying signal change unit 202 sets low density information of an identifying signal (dot pattern) so that the dot pattern is not conspicuous on the recording medium when it is recorded, and outputs the identifying signal to the image forming unit 203.

More specifically, in case of the method shown in FIG. 6, a dot corresponding to the FF area in FIG. 6 of an original image is not replaced by the highest density but by F0 or the like slightly lower than FF, thus adding an identifying signal which is not so conspicuous even in the recording mode for a medium with poor fixing characteristics.

On the other hand, when the recording mode of the image forming unit 203 is a normal recording mode, the unit 202 directly outputs the identifying signal to the image forming unit 203 (a dot of the FF area in FIG. 6 in an original image is replaced by the highest density).

The additional unit 105 in the image forming unit 203 adds the input identifying signal (dot pattern shown in FIG. 6 or 9) to an original image signal input from, e.g., an external computer, and records the image signal added with the identifying signal as a color image by the above-mentioned method. The additional unit 105 adds the identifying signal to only a yellow-frame image as in the first embodiment.

When the recording condition of the image forming unit 203 is set to improve the fixing characteristics of recording agents on a recording medium, the identifying signal change unit 202 sets low density for a dot pattern representing an identifying signal, and the dot pattern with low density is added to the original image. Hence, an identifying signal recorded on a recording medium can be prevented from standing out when it is recorded in the recording mode that has improved fixing characteristics in the electrophotography type image recording apparatus.

This embodiment uses the identifying signal adding method shown in FIG. 6. However, the present invention is not limited to such specific method. For example, the method shown in FIG. 9 may be used. In this method, the same effect as described above can be obtained by changing α and β (decreasing α) in correspondence with the recording mode.

As in the first embodiment, when the image processing unit 3000 has a plurality of modes including an OHT image processing mode for performing image processing, color processing, and the like suitable for recording an image on a recording medium with poor fixing characteristics such as an OHT, and a normal image processing mode for performing image processing, color processing, and the like suitable for normal paper, and when the image processing and color processing are executed in the OHT image processing mode, the density of a dot pattern representing the identifying signal to be output from the identifying signal change unit 202 is automatically decreased, thus obtaining the same effect as described above. More specifically, since the OHT image processing mode is likely to correspond to the OHT recording mode, if such processing mode is present, the density of the dot pattern representing the identifying signal can be decreased in correspondence with that mode. Since the above-mentioned processing does not require any sensors for detecting the type of paper sheet, the cost of the apparatus can be reduced.

The third embodiment of the present invention will be described below. This embodiment has a circuit arrangement different from that in the first embodiment, but can obtain the same effect.

Figure 3:
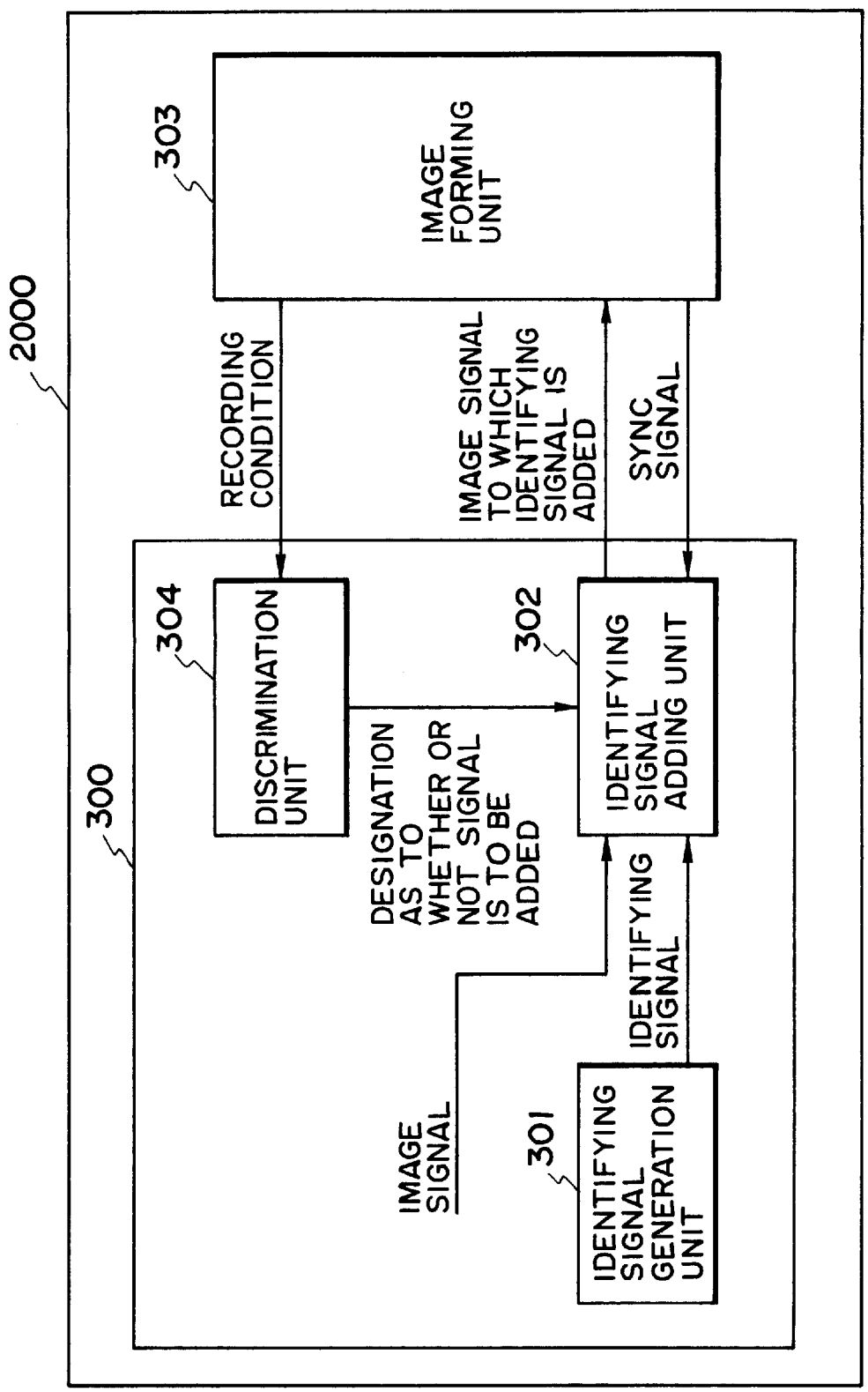
FIG. 3 is a block diagram showing the flow of signal processing according to the third embodiment of the present invention.

FIG. 3 shows the flow of signal processing of the third embodiment. An identifying signal generation unit 301 generates an identifying signal to be added to an image from unique information such as the machine number or the like of the image recording apparatus, and outputs it to an identifying signal adding unit 302. An image forming unit 303 outputs information concerning the recording conditions corresponding to the next image signal to be input to a discrimination unit 304.

The discrimination unit 304 receives the recording condition information from the image forming unit 303, and discriminates based on the recording conditions whether or not the identifying signal adding unit 302 is to add an identifying signal. The unit 304 outputs the discrimination result to the identifying signal adding unit 302.

The identifying signal adding unit 302 receives the identifying signal from the identifying signal generation unit 301, externally receives an image signal, and also receives a designation as to whether or not the identifying signal is to be added to the image signal input from, e.g., an external computer, and the image signal with the identifying signal is to be output, from the discrimination unit 304.

When the designation indicates addition of the identifying signal, the identifying signal adding unit 302 adds the identifying signal to the image signal, and outputs the image signal to the image forming unit 303. The image forming unit 303 records the image signal added with the identifying signal by the identifying signal adding unit 302 by the above-mentioned method.

Note that the dot pattern of the identifying signal uses one of the methods shown in FIGS. 6 and 9 described in the first embodiment, and a detailed description thereof will be omitted.

Discrimination in the discrimination unit 304 will be explained in detail below. When the recording mode of the image forming unit 303 sets a lower traveling speed of a recording medium than in a normal mode to improve the fixing characteristics of recording agents (toner) with respect to a recording medium such as a specific paper sheet, OHT, or the like with poor fixing characteristics of recording agents (in case of the OHT recording mode in the first embodiment), the discrimination unit 304 inhibits the identifying signal adding unit 302 from adding a signal. On the other hand, when the recording mode of the image forming unit 303 is a normal mode, the discrimination unit 304 permits the identifying signal adding unit 302 to add a signal.

The block arrangement of the identifying signal generation unit 301 and identifying signal adding unit 302 will be described in detail below with reference to FIG. 4.

Figure 4:
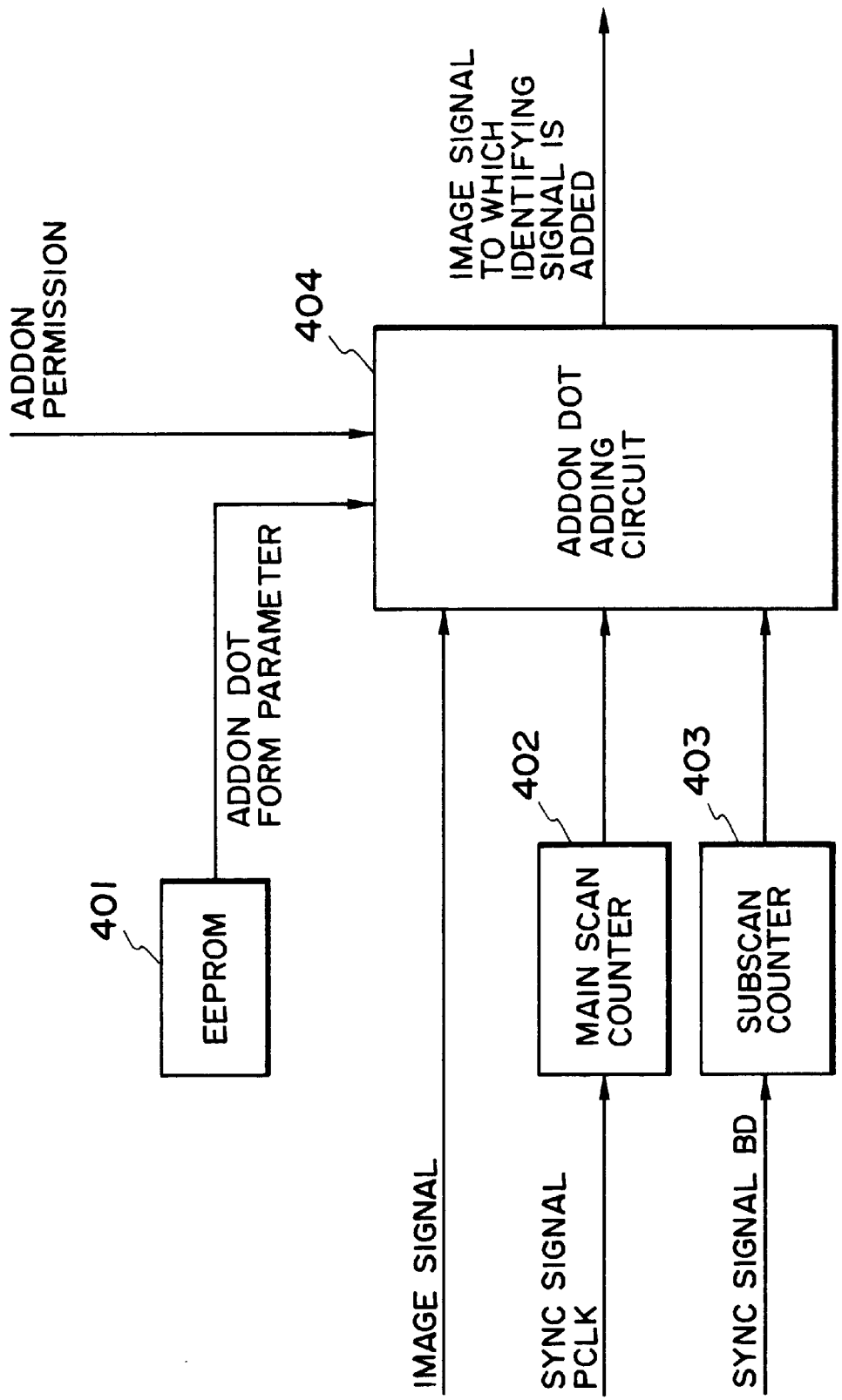
FIG. 4 is a block diagram showing the arrangement of an identifying signal generation unit and identifying signal adding unit of the third embodiment.

In FIG. 4, an EEPROM 401 holds, e.g., 48-bit additional information such as information (model number, machine number, or the like) unique to the recording apparatus to be added to the input image signal (yellow image signal alone) as an addon dot form parameter, such as shown in FIGS. 6 and 9, and outputs an identifying signal to an addon dot adding circuit 404.

A main scan counter 402 counts main scan clock signals PCLK of the image signal, and outputs an ON signal at a position where an addon dot is to be added. A subscan counter 403 counts subscan clock signals BD of the image signal, and outputs an ON signal at an addon line.

The addon dot adding circuit 404 receives the addon dot form parameter stored in the EEPROM 401, and generates an addon dot to output the highest density FF in an FF area and the lowest density 00 in a 00 area, only when a yellow image signal is to be processed, an addon permission signal, which is set ON only when the discrimination unit 304 permits to add an identifying signal, is ON, and both the main scan counter 402 and subscan counter 403 output ON signals. On the other hand, when at least one of the addon permission signal and the outputs from the main scan counter 402 and subscan counter 403 is not ON, the adding circuit 404 directly outputs the input image signal.

As in the first embodiment, when the image processing unit 3000 has a plurality of modes including an OHT image processing mode for performing image processing, color processing, and the like suitable for recording an image on a recording medium with poor fixing characteristics such as an OHT, and a normal image processing mode for performing image processing, color processing, and the like suitable for normal paper, and when the image processing and color processing are executed in the OHT image processing mode, the identifying signal adding unit 302 is automatically controlled not to output any identifying signal, thus obtaining the same effect. Since this processing does not require any sensors for detecting the type of sheet, an apparatus with a simple arrangement can be provided.

Figure 5:
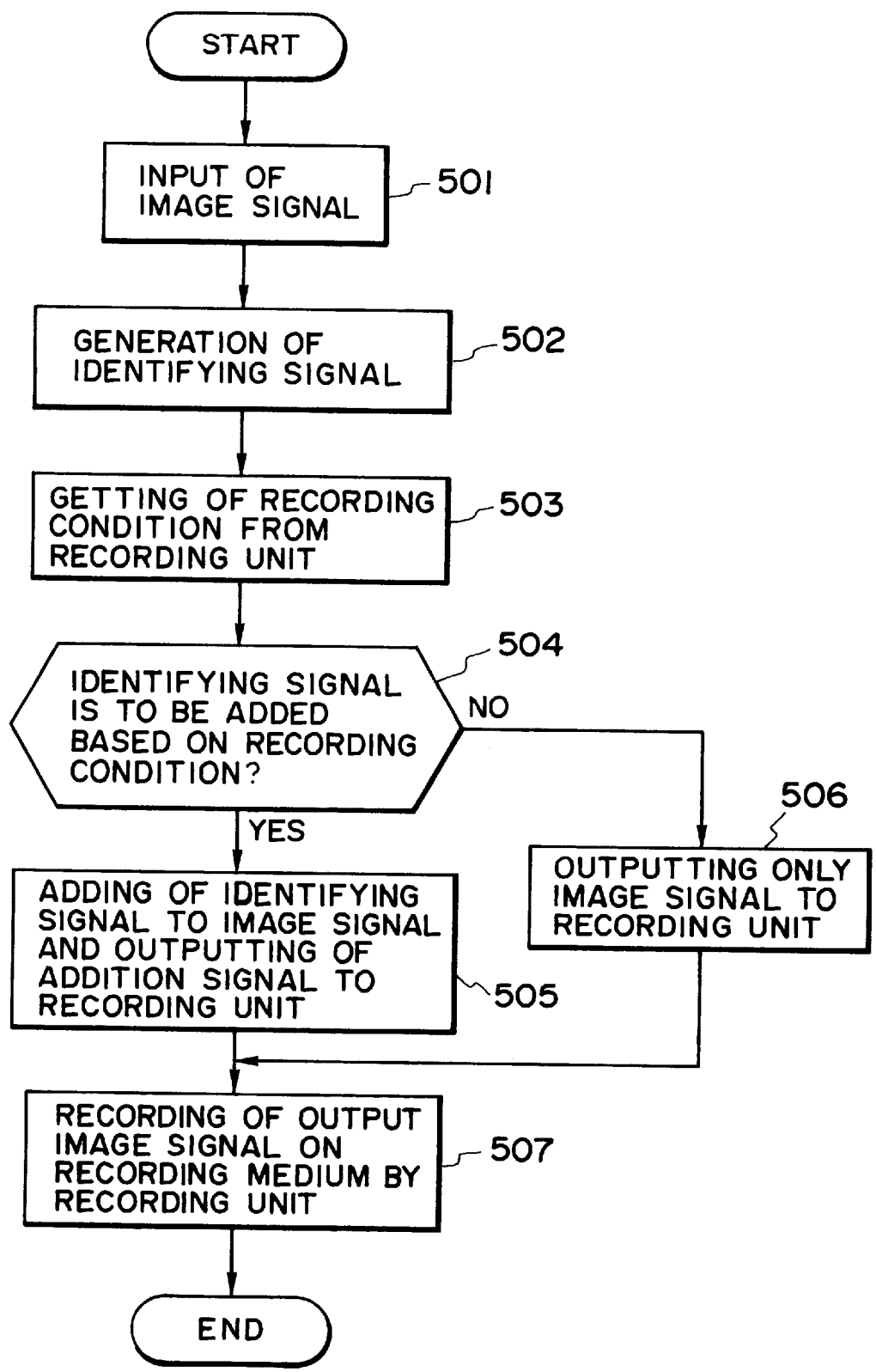
FIG. 5 is a flow chart for explaining the control operation of the third embodiment.

FIG. 5 is a flow chart for explaining the control sequence of this embodiment.

When the operator directs to start image formation, an image to be printed is input from an external apparatus such as a computer in step 501. In step 502, information unique to the image recording apparatus is generated as an identifying signal.

In step 503, recording conditions (the recording mode or image processing mode as in the first embodiment) are input from the image forming unit 303.

It is then checked in step 504 based on the recording conditions (the recording mode or image processing mode) input in step 503 if the image signal is to be recorded by adding the identifying signal). If it is determined in step 504 that the identifying signal is to be added in the selected mode (normal recording mode or normal image processing mode), the flow advances to step 505. On the other hand, if it is determined in step 504 that the identifying signal is not to be added in the selected mode (OHT recording mode or OHT image processing mode), the flow advances to step 506.

In step 505, the identifying signal is added to the input image signal, and the image signal is output to the image forming unit 303. In step 507, the image forming unit 303 records the input signal on the recording medium.

In step 506, the input image signal is directly output to the image forming unit 303. In step 507, the image forming unit 303 records the input signal on the recording medium.

Still another embodiment of the present invention will be explained below.

Figure 7:
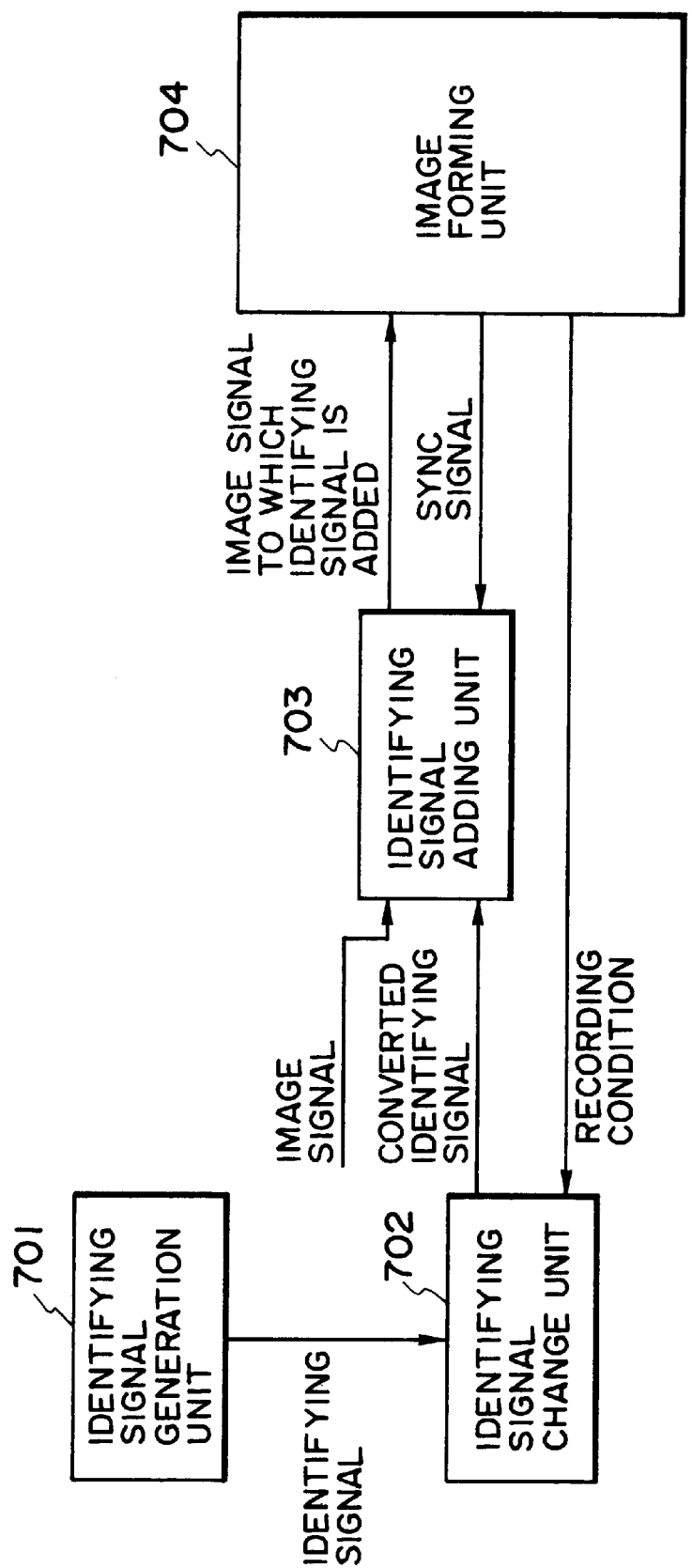
FIG. 7 is a block diagram showing the flow of signal processing according to the fourth embodiment of the present invention.

FIG. 7 shows the flow of signal processing of the fourth embodiment. An identifying signal generation unit 701 generates an identifying signal to be added to an image from unique information such as the machine number or the like of the image recording apparatus, and outputs it to an identifying signal change unit 702.

An image forming unit 704 outputs information pertaining to the recording conditions (the recording mode or image processing mode as in the first embodiment) corresponding to the next image signal to be input to the identifying signal change unit 702. The identifying signal change unit 702 receives the recording condition information from the image forming unit 704, and converts the input identifying signal to have low recording density when the recording conditions include a low traveling speed of a recording medium or depending on various recording conditions such as the type of recording medium, temperature, humidity, and the like. The unit 702 outputs the converted identifying signal to an identifying signal adding unit 703. Otherwise, the unit 702 directly outputs the input identifying signal to the identifying signal adding unit 703.

The identifying signal adding unit 703 receives the identifying signal from the identifying signal change unit 702, receives an image signal from, e.g., an external computer, and also receives sync signals from the image forming unit 704. The unit 703 adds the identifying signal to the image signal based on the sync signals, and outputs the image signal to the image forming unit 704. The image forming unit 704 records an image on the basis of the image signal added with the identifying signal received from the identifying signal adding unit 703.

Note that the method of adding the identifying signal (dot pattern) is the same as that shown in FIG. 6 or 9 used in the first embodiment, and a detailed description thereof will be omitted.

The identifying signal change unit 702 sets lower density information of the identifying signal, for example, when the image forming unit 704 outputs the conditions for improving the fixing characteristics of recording agents on a recording medium. Then, the unit 702 outputs that identifying signal.

This method is the same as that in the second embodiment. More specifically, in case of the adding method shown in FIG. 6, the density in an FF area is slightly decreased in correspondence with the recording mode or image processing mode, or in case of the adding method in FIG. 9, α and β are changed (by decreasing α) in correspondence with the recording mode or image processing mode, thus obtaining the same effect.

Figure 8:
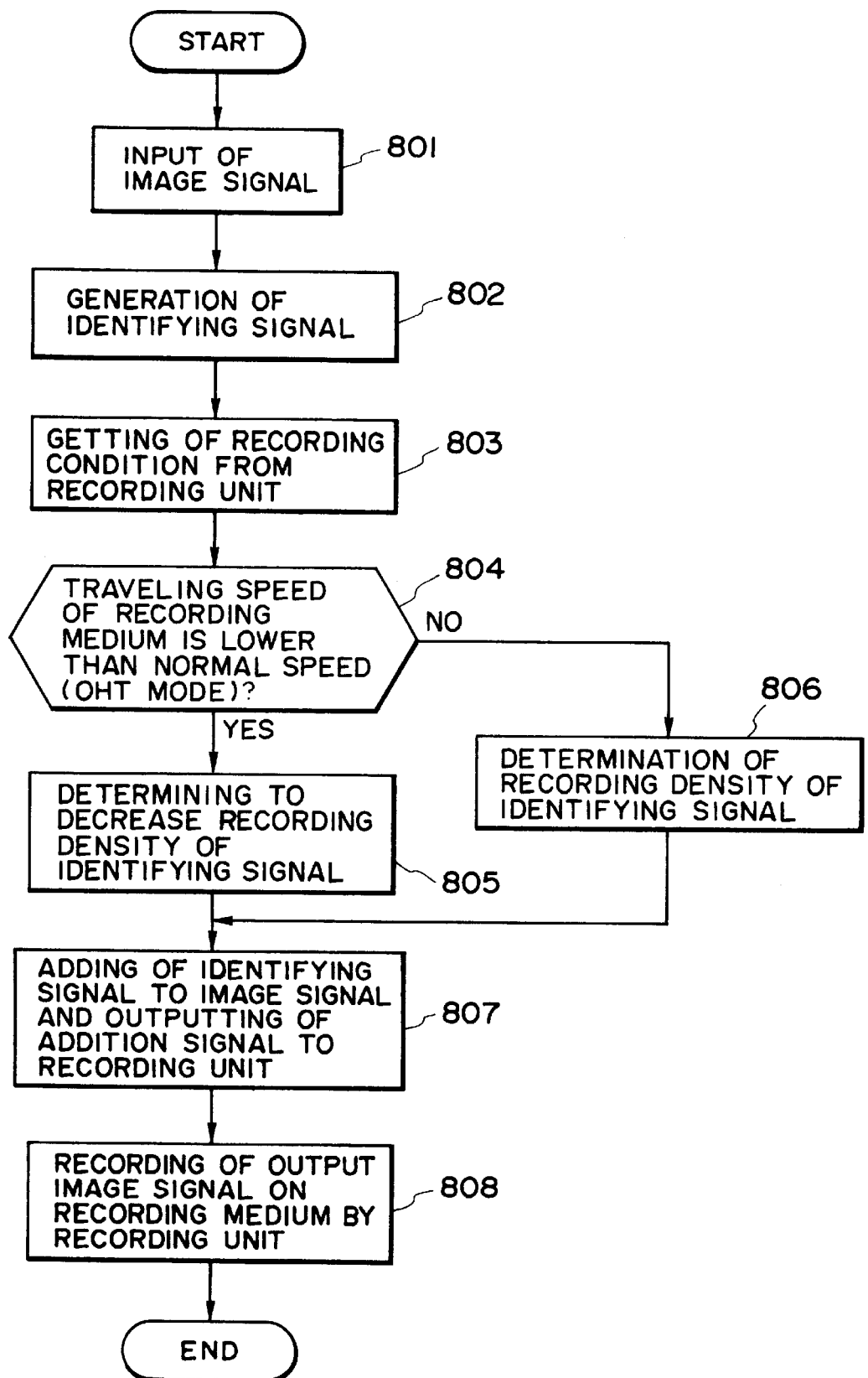
FIG. 8 is a flow chart for explaining the control operation of the fourth embodiment.

FIG. 8 is a flow chart for explaining the control sequence of this embodiment.

When the operator directs to start image formation, an image to be printed is input from an external apparatus such as a computer in step 801. In step 802, information unique to the image recording apparatus is generated as an identifying signal.

In step 803, recording conditions (the recording mode or image processing mode as in the first embodiment) are input from the image forming unit 704. It is then checked in step 804 based on the input recording conditions if the identifying signal is to be recorded while decreasing its density due to a low traveling speed of a recording medium such as an OHT. If it is determined in step 804 that the density of the identifying signal is to be decreased, the flow advances to step 805; otherwise, the flow advances to step 806.

After the recording density of the identifying signal is decreased in step 805, the adding unit adds the changed identifying signal to the input image signal and outputs the image signal in step 807. In step 808, the image forming unit 704 records the input signal on a recording medium.

In step 806, the recording density of the identifying signal is left unchanged. In step 807, the adding unit adds the identifying signal to the input image signal and outputs the image signal. In step 808, the image forming unit 704 records the input signal on a recording medium.

Note that the present invention is not limited to the above embodiments, and various modifications such as combinations of the above embodiments may be made.

Note that the image processing mode described in the first embodiment and the like is not limited to that processed by the image processing unit 3000. When an image processing mode executed in advance by an external computer that outputs an image signal includes a plurality of image processing modes such as an OHT image processing mode, normal image processing mode, and the like, the same effect can be obtained by receiving a command indicating such image processing mode from the external computer.

More specifically, when the image processing mode of the external computer is the OHT image processing mode, no identifying signal is added; when it is one of other image processing modes, the identifying signal is added. Alternatively, when the image processing mode of the external computer is the OHT image processing mode, the identifying signal with low density is added; when it is one of other image processing modes, the identifying signal with initial density is added.

The method of adding the identifying signal (additional information) is not limited to those in FIGS. 6 and 9. For example, when the original image is a binary image, binary information of 1 or 0 can be hidden in each line by always setting the distance between neighboring print pixels in a certain pixel line by an odd or even number of pixels. Also, other known methods are included in the present invention.

In the above embodiments, the method of adding the additional information is switched between two different recording modes or image processing modes (OHT/normal). However, the present invention is not limited to such specific modes. In addition, the third and fourth modes may be used, and the adding methods may be appropriately switched in correspondence with the selected mode. Such modification is also included in the present invention.

Note that the present invention may be applied to part of either a system constituted by a plurality of equipments (e.g., a host computer, an interface device, a reader, a printer, and the like), or an apparatus consisting of a single equipment (e.g., a copying machine, a facsimile apparatus, or the like).

The present invention is not limited to the apparatus and method for realizing the above embodiments, and also includes a case wherein a program code of software for implementing each of the above embodiments is supplied, and a computer of the above system or apparatus controls various devices according to the program code to realize each of the above embodiments.

In this case, the program code itself of the software realizes the functions of the above-mentioned embodiments, and the program code itself and means for supplying the program code to the computer, i.e., a storage medium that stores the program code, are included in the present invention.

As the storage medium that stores the program code, for example, a floppy disk, hard disk, optical disk, magneto-optical disk, CD-ROM, magnetic tape, nonvolatile memory card, ROM, and the like may be used.

The functions of the above-mentioned embodiments may be realized not only when the computer controls various devices according to the supplied program code alone but also when the computer realizes each of the above embodiments in collaboration with an OS (operating system) or another application software running on the computer. Such modification is also included in the present invention.

Furthermore, after the supplied program code is stored in a memory equipped on a function extension board or unit connected to the computer, a CPU or the like equipped on the function extension board or unit may execute some or all of actual processing operations to realize each of the above embodiments. Such modification is also included in the present invention.

As described above, according to the present invention, control for adding additional information to an input image can be efficiently done in correspondence with a recording sheet used without any sensors for detecting the type of recording sheet.

More specifically, by using the fact that the type of image formation process is likely to be selected in correspondence with the type of recording sheet, even when a different image formation process is used, additional information can be added appropriately, or whether or not additional information is to be added is controlled, thus adding the additional information suitable for the type of recording sheet.

Also, by using the fact that the type of image processing mode is likely to be selected in correspondence with the type of recording sheet, additional information can be added appropriately or whether or not additional information is to be added is controlled in correspondence with the image processing mode, thus adding the additional information suitable for the type of recording sheet.

Further, since the present invention does not require the sensor for detecting the type of recording sheet, the cost of the apparatus can be reduced.

Various modifications of the present invention may be made within the scope of the appended claims.

What is claimed is:

1. An image processing apparatus, which selectively uses a plurality of image processing modes suitable for different types of recording sheets, comprising:

adding means for determining in accordance with the image processing mode used by said image processing apparatus to process input image data whether or not additional information is to be added to the input image data to be hardly identified by a human eye, and executing the addition in accordance with a determination result; and output means for outputting image data to which the additional information is added by said adding means to image forming means.

2. An apparatus according to claim 1, wherein the additional information is expressed by a dot pattern made up of a plurality of dots.

3. An apparatus according to claim 1, wherein said adding means does not execute the addition when said image processing apparatus uses the image processing mode for performing image processing suitable for recording an image indicated by the input image data on an OHT.

4. An apparatus according to claim 1, wherein said adding means executes the addition when said image processing apparatus uses the image processing mode for performing image processing suitable for recording an image indicated by the input image data on a normal paper sheet.

5. An apparatus according to claim 1, further comprising said image forming means for forming an image based on the image data output from said output means.

6. An apparatus according to claim 1, wherein the input image data is color image data consisting of a plurality of color components, and said adding means adds the additional information not to all of the plurality of color components but to at least one color component.

7. An apparatus according to claim 1, wherein each dot is defined by a plurality of pixels, and is made up of a first area where an image indicated by the input image data is modulated to a highest density, and a second area where an image indicated by the input image data is modulated to a lowest density.

8. An apparatus according to claim 1, wherein each dot is defined by a plurality of pixels, and is made up of a first area where a density of an image indicated by the input image data is increased by $\alpha$, and a second area where a density of an image indicated by the input image data is decreased by $\beta$.

9. An apparatus according to claim 1, wherein said adding means differs a density of the additional information to be added to the input image data in accordance with the image processing mode.

10. An image processing method, which selectively uses a plurality of image processing modes suitable for different types of recording sheets, comprising:

an adding step of determining in accordance with the image processing mode used by said image processing apparatus to process input image data whether or not additional information is to be added to the input image data to be hardly identified by a human eye, and executing the addition in accordance with a determination result; and an output step of outputting image data to which the additional information is added in said adding step to image forming means.

11. A program for controlling an image processing apparatus, which selectively uses a plurality of image processing modes suitable for different types of recording sheets, comprising:

an adding step of determining in accordance with the image processing mode used by said image processing apparatus to process input image data whether or not additional information is to be added to the input image data to be hardly identified by a human eye, and executing the addition in accordance with a determination result; and an output step of outputting image data to which the additional information is added in said adding step to image forming means.

12. An image processing apparatus, which selectively uses a plurality of image processing modes suitable for different types of recording sheets, comprising:

adding means for determining a method of adding additional information to input image data to be hardly identified by a human eye in accordance with the image processing mode used by said image processing apparatus to process the input image data, and executing the addition in accordance with a determination result; and output means for outputting image data to which the additional information is added by said adding means to image forming means.

13. An apparatus according to claim 12, wherein said adding means differs a density of the additional information to be added to the input image data in accordance with the image processing mode.

14. An image processing method, which selectively uses a plurality of image processing modes suitable for different types of recording sheets, comprising:

an adding step of determining a method of adding additional information to input image data to be hardly identified by a human eye in accordance with the image processing mode used by said image processing apparatus to process the input image data, and executing the addition in accordance with a determination result; and an output step of outputting image data to which the additional information is added in said adding step to image forming means.

15. A program for controlling an image processing apparatus, which selectively uses a plurality of image processing modes suitable for different types of recording sheets, comprising:

an adding step of determining a method of adding additional information to input image data to be hardly identified by a human eye in accordance with the image processing mode used by said image processing apparatus to process the input image data, and executing the addition in accordance with a determination result; and an output step of outputting image data to which the additional information is added in said adding step to image forming means.

* * * * *

UNITED STATES PATENT AND TRADEMARK OFFICE
CERTIFICATE OF CORRECTION

PATENT NO. : 6,271,930 B1
DATED : August 7, 2001
INVENTOR(S) : Fumiya Yamazaki

It is certified that error appears in the above-identified patent and that said Letters Patent is hereby corrected as shown below:

<u>Title page,</u>
Item [57] ABSTRACT,
Line 3, "of" should read -- of a --.
Line 8, "of" should read -- of an --.

<u>Column 6,</u>
Line 47, "FO" should read -- F0 --.

Signed and Sealed this

Second Day of April, 2002

Attest:

*Attesting Officer*

JAMES E. ROGAN
*Director of the United States Patent and Trademark Office*